(12) United States Patent  
Oh et al.

(10) Patent No.: US 9,099,736 B2  
(45) Date of Patent: Aug. 4, 2015

(54) HIGH-CAPACITY CATHODE ACTIVE MATERIAL AND LITHIUM SECONDARY BATTERY INCLUDING THE SAME

(71) Applicant: LG Chem, Ltd., Seoul (KR)

(72) Inventors: Song Taek Oh, Daejeon (KR); Jung Hwan Park, Daejeon (KR); Su Hwan Kim, Daejeon (KR); Geun Chang Chung, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/857,340

(22) Filed: Apr. 5, 2013

(65) Prior Publication Data

US 2013/0224585 A1     Aug. 29, 2013

Related U.S. Application Data

(63) Continuation of application No. PCT/KR2012/007540, filed on Sep. 20, 2012.

(30) Foreign Application Priority Data

Sep. 20, 2011   (KR) .......................... 10-2011-0094787

(51) Int. Cl.
    *H01M 4/02*      (2006.01)
    *H01M 4/36*      (2006.01)
    (Continued)

(52) U.S. Cl.
CPC ........... *H01M 4/366* (2013.01); *C01G 45/1228* (2013.01); *C01G 49/009* (2013.01); *C01G 51/50* (2013.01); *C01G 53/50* (2013.01); *H01M 4/505* (2013.01); *H01M 4/625* (2013.01); *H01M 4/64* (2013.01); *C01P 2006/40* (2013.01);

(Continued)

(58) Field of Classification Search
None
See application file for complete search history.

(56) References Cited

U.S. PATENT DOCUMENTS 6,306,542 B1 * 10/2001 Nakano et al. ................. 429/224
7,211,237 B2 * 5/2007 Eberman et al. ......... 423/594.15

(Continued)

FOREIGN PATENT DOCUMENTS

CN    101414675 A    4/2009
CN    102037589 A    4/2011

(Continued)

OTHER PUBLICATIONS

International Search Report for Application No. PCT/KR2012/007540 dated Jan. 31, 2013.

*Primary Examiner* — Patrick Ryan
*Assistant Examiner* — Jose Colucci Rios
(74) *Attorney, Agent, or Firm* — Lerner, David, Littenberg, Krumholz & Mentlik, LLP (57) ABSTRACT

Provided is a cathode active material including lithium manganese-based oxide, wherein the lithium manganese-based oxide has a layered crystal structure, has a content of manganese (Mn) greater than contents of other transition metal(s), includes 1 mole or more of lithium (Li) with respect to 1 mole of lithium transition metal oxide, has a plateau potential range in which lithium deintercalation as well as oxygen release occurs during initial charging in a high voltage range of 4.4 V or more, has domains included in the layered crystal structure exhibiting electrochemical activity due to a structural change in a potential range of 3.5 V or less after the initial charging, and includes conductive materials for improving electrical conductivity of the lithium manganese-based oxide in a potential range of 3.5 V or less after the initial charging.

21 Claims, 1 Drawing Sheet

(51) Int. Cl.
    *H01M 4/505*         (2010.01)
    *H01M 4/62*          (2006.01)
    *C01G 45/12*         (2006.01)
    *C01G 49/00*         (2006.01)
    *C01G 51/00*         (2006.01)
    *C01G 53/00*         (2006.01)
    *H01M 4/64*          (2006.01)
    *H01M 10/052*        (2010.01)
    *H01M 4/587*         (2010.01)
    *H01M 4/04*          (2006.01)
    *H01M 4/131*         (2010.01)

(52) U.S. Cl.
    CPC ............ *H01M4/0404* (2013.01); *H01M 4/131* (2013.01); *H01M 4/364* (2013.01); *H01M 4/587* (2013.01); *H01M 10/052* (2013.01); *Y02E 60/122* (2013.01); *Y02T 10/7011* (2013.01)

(56) References Cited

U.S. PATENT DOCUMENTS

| | | | |
|---|---|---|---|
| 2002/0122983 A1* | 9/2002 | Nakai et al. | 429/224 |
| 2003/0022063 A1* | 1/2003 | Paulsen et al. | 429/231.3 |
| 2003/0175588 A1* | 9/2003 | Zhang | 429/217 |
| 2006/0093920 A1 | 5/2006 | Cheon et al. | |
| 2008/0160406 A1* | 7/2008 | Kato et al. | 429/217 |
| 2009/0104530 A1* | 4/2009 | Shizuka et al. | 429/223 |
| 2009/0117469 A1 | 5/2009 | Hiratsuka et al. | |
| 2011/0012067 A1* | 1/2011 | Kay | 252/507 |
| 2011/0027651 A1 | 2/2011 | Sun et al. | |
| 2011/0200880 A1 | 8/2011 | Yu | |
| 2011/0250499 A1 | 10/2011 | Hiratsuka | |
| 2011/0311869 A1 | 12/2011 | Oh et al. | |
| 2011/0311872 A1 | 12/2011 | Oh et al. | |
| 2012/0301784 A1* | 11/2012 | Yano et al. | 429/213 |

FOREIGN PATENT DOCUMENTS

| | | |
|---|---|---|
| JP | H11-154515 A | 6/1999 |
| JP | 2001-328813 A | 11/2001 |
| JP | 2006-128119 A | 5/2006 |
| JP | 2008-226741 A | 9/2008 |
| JP | 2011-171113 A | 9/2011 |
| KR | 20100068459 A | 6/2010 |
| KR | 20100081455 A | 7/2010 |
| KR | 20100092918 A | 8/2010 |
| KR | 20110084231 A | 7/2011 |
| KR | 20110101332 A | 9/2011 |
| WO | 2011/105832 A2 | 9/2011 |
| WO | 2011105833 A2 | 9/2011 |

* cited by examiner

HIGH-CAPACITY CATHODE ACTIVE MATERIAL AND LITHIUM SECONDARY BATTERY INCLUDING THE SAME

This application is a continuation of PCT/KR2012/007540 filed Sep. 20, 2012, which claims the priority of Korean Patent Application No. 10-2011-0094787 filed on Sep. 20, 2011, in the Korean Intellectual Property Office, the disclosures of which are incorporated herein by reference.

TECHNICAL FIELD

The present invention relates to a cathode active material comprising a layer-structured lithium manganese-based oxide and a lithium secondary battery including the same.

BACKGROUND ART

Recently, research into improving capacity of lithium secondary batteries has been actively conducted as lithium secondary batteries have been used as power sources of vehicles as well as portable electronic devices such as mobile phones, personal digital assistants (PDAs), and laptop computers. In particular, demands for increasing capacity of lithium secondary batteries have been further increased as an amount of energy consumption has been increased according to multi-function of portable electronic devices, and development of a high-capacity lithium secondary battery able to stably maintain power in a state of charge (SOC) range along with high power is continuously required in order to be used as a power source of a medium and large sized device, such as a hybrid electric vehicle (HEV), a plug-in hybrid electric vehicle (PHEV), and an electric vehicle (EV).

A battery using lithium cobalt-based oxide as a cathode active material among these lithium secondary batteries is the most widely used due to excellent electrode lifetime and high high-rate charge and discharge efficiency. However, since high-temperature safety of the lithium cobalt oxide is low and cobalt used as a raw material is a relatively expensive material, there may be a limitation in price competitiveness.

Accordingly, lithium-containing manganese oxide has been proposed as a cathode active material. In particular, spinel-structured lithium-containing manganese oxide has advantages in that thermal stability may be excellent, the price may be low, and the synthesis thereof may be facilitated. However, the spinel-structured lithium-containing manganese oxide has disadvantages in that capacity may be low, lifetime characteristics may be degraded due to a side reaction, and cycle characteristics and high-temperature characteristics may be poor.

As a result, layer-structured lithium-containing manganese oxide is suggested in order to compensate for the low capacity of the spinel and secure excellent thermal safety of manganese-based active materials. In particular, layer-structured aLi$_2$MnO$_3$-(1−a)LiMO$_2$ having a content of manganese (Mn) greater than those of other transition metal(s) may have relatively high initial irreversible capacity. However, relatively high capacity may be manifested during charging at a voltage of 4.4 V or more based on a cathode potential.

That is, in the case that overcharging is performed at a high voltage of 4.4 V or more (for example, 4.5 V or more) based on a cathode potential during initial charging, the layer-structured lithium-containing manganese oxide exhibits a high capacity of over 250 mAh/g as well as an excessive amount of gas, such as oxygen and carbon dioxide, being generated, while exhibiting a plateau potential range of 4.5 V to 4.8 V.

Thus, some of remaining lithium (Li) and transition metals may migrate due to the excessive deintercalation of lithium ions and release of oxygen during the charging at a high voltage of 4.4 V or more based on a cathode potential, and a phase transition into a spinel-like structure may be inferred through this process. In particular, it is estimated that additional manifestation of capacity near 3V in this case may be due to the transition into a spinel-like structure.

However, in the case that the transition into a spinel-like structure occurs, since electrical conductivity is insufficient in 3V region (2.7 V to 3.1 V), desired output characteristics and cycle durability may not be secured by itself.

Therefore, with respect to a cathode active material including the layer-structured lithium-containing manganese oxide, there is an urgent need to develop a cathode active material able to improve output characteristics and cycle durability in the 3V region by preventing a decrease in electrical conductivity due to the structural change after a first charge and discharge cycle.

DISCLOSURE OF THE INVENTION

Technical Problem

According to an aspect of the present invention, the inventors of the present invention, through a significant amount of in-depth research and various experimentations, confirmed that when a composite is formed by using the layer-structured lithium manganese-based oxide and different kinds of carbon-based conductive materials, high capacity may be provided by a unique structural change during an initial charge and discharge process, and simultaneously, output characteristics and cycle characteristics in 3V region as well as 4 V region may also be improved by preventing a decrease in electrical conductivity in the 3 V region, thereby leading to the completion of the present invention.

Technical Solution

According to an aspect of the present invention, there is provided a cathode active material including a layer-structured lithium manganese-based oxide, wherein the layer-structured lithium manganese-based oxide has a content of manganese (Mn) greater than contents of other transition metal(s), includes Li in an amount of moles equal to or more than that of moles of transition metal including Mn, has a plateau potential range in which lithium deintercalation as well as release of gas, such as oxygen and carbon dioxide, occurs during initial charging in a high voltage range of 4.4 V or more, exhibits electrochemical activity due to a structural change to a spinel-like structure after the initial or several times of charging at a voltage of 4.4 V or more, and includes different kinds of carbon-based conductive materials for improving electrical conductivity of the lithium manganese-based oxide in a potential range of 3.5 V or less after the initial charging.

According to an exemplary embodiment of the present invention, the layer-structured lithium manganese-based oxide may have a composition of the following Chemical Formula 1:

[Chemical Formula 1]

(where 0≤a≤0.2, x>(1−a)/2, and M is one or more selected from the group consisting of Mn, nickel (Ni), cobalt (Co), iron (Fe), chromium (Cr), vanadium (V), copper (Cu), zinc (Zn), titanium (Ti), aluminum (Al), magnesium (Mg), and boron (B)).

Also, the layer-structured lithium manganese-based oxide may be formed of a primary particle or a secondary particle in which the plurality of primary particles is agglomerated.

Further, the cathode active material may be a composite of the lithium manganese-based oxide with a first carbon-based material having a relatively large particle diameter and a second carbon-based material having a relatively small particle diameter.

According to another exemplary embodiment of the present invention, the second carbon-based material may be disposed between the primary particles of the lithium manganese-based oxide in the secondary particle and the first carbon-based material may be disposed on an outer surface of the secondary particle of the lithium manganese-based oxide.

Also, the second carbon-based material may be mainly disposed between the primary particles on a portion of the outer surface of the secondary particle when the secondary particle of the lithium manganese-based oxide is assumed as a sphere, and the second carbon-based material may be disposed between the primary particles in a portion ranging from 0.3 r to r from a center of the secondary particle based on a radius (r) of the secondary particle.

Meanwhile, a particle diameter of the first carbon-based material may be in a range of 0.3 μm to 30 μm and a particle diameter of the second carbon-based material may be in a range of 10 nm to 500 nm, which is a range of a particle diameter smaller than that of the first carbon-based material.

A content of the first carbon-based material may be in a range of 1 wt % to 15 wt % based on a total weight of the cathode active material, a content of the second carbon-based material may be in a range of 1 wt % to 15 wt %, and a total content of the first carbon-based material and the second carbon-based material may be in a range of 2 wt % to 20 wt %.

The cathode active material may be formed by using any one method of high-energy milling, wet milling, mechano-fusion, or hybridization of the layer-structured lithium manganese-based oxide with the first carbon-based material and the second carbon-based material.

The cathode active material may be formed by synthesis through addition of the first carbon-based material and the second carbon-based material during sintering of the layer-structured lithium manganese-based oxide.

Also, the cathode active material may be formed by synthesis through addition of the first carbon-based material and the second carbon-based material or precursors thereof to a lithium compound and a manganese compound used in synthesis of the layer-structured lithium manganese-based oxide.

The first carbon-based material may be one or more selected from the group consisting of natural graphite and artificial graphite, and the second carbon-based material may be one or more selected from the group consisting of Denka black, channel black, furnace black, Ketjen black, and carbon black.

Meanwhile, the cathode active material may further include one or more lithium-containing metal oxides selected from the group consisting of lithium cobalt oxide, lithium nickel oxide, lithium manganese oxide including lithium manganese spinel, lithium cobalt-nickel oxide, lithium cobalt-manganese oxide, lithium manganese-nickel oxide, lithium cobalt-nickel-manganese oxide, lithium-containing olivine-type phosphate, and oxide having other element(s) substituted or doped thereto.

The lithium-containing metal oxide may be included within an amount of 50 parts by weight based on 100 parts by weight of the cathode active material.

The other element(s) is one or more selected from the group consisting of Al, Mg, Ni, Co, Fe, Cr, V, Ti, Cu, B, calcium (Ca), Zn, zirconium (Zr), niobium (Nb), molybdenum (Mo), strontium (Sr), antimony (Sb), tungsten (W), and bismuth (Bi).

According to another aspect of the present invention, there is provided a cathode mixture including the cathode active material.

According to another aspect of the present invention, there is provided a cathode for a secondary battery having a current collector coated with the cathode mixture.

According to another aspect of the present invention, there is provided a lithium secondary battery including the cathode for a secondary battery.

The lithium secondary battery may be used as a unit cell of a battery module, a power source of a medium and large sized device.

The medium and large sized device may be a power tool; an electric vehicle (EV) including an electric car, a hybrid electric vehicle (HEV), and a plug-in hybrid electric vehicle (PHEV); an electric two-wheeled vehicle including an electric bike and an electric scooter; an electric golf cart; an electric truck; an electric commercial vehicle; or a power storage system.

Advantageous Effects

As described above, a cathode active material according to the present invention may provide high capacity due to a unique structural change during an initial charge and discharging process, and simultaneously, may exhibit excellent lifetime characteristics, and thus, a lithium secondary battery having excellent performance may be prepared by using the same.

MODE FOR CARRYING OUT THE INVENTION

Hereinafter, the present invention will be described in detail.

The present invention provides a cathode active material including layer-structured lithium manganese-based oxide, wherein the layer-structured lithium manganese-based oxide has a content of manganese (Mn) greater than contents of other transition metal(s), includes 1 mole or more of lithium (Li) with respect to 1 mole of lithium transition metal oxide, has a plateau potential range in which lithium deintercalation as well as oxygen release occurs during initial charging in a high voltage range of 4.4 V or more, exhibits electrochemical activity due to a structural change to a spinel-like structure after the initial or several times of charging at a voltage of 4.4 V or more, and includes different kinds of carbon-based conductive materials for improving electrical conductivity of the lithium manganese-based oxide in a potential range of 3.5 V or less after the initial charging.

The layer-structured lithium manganese-based oxide provides higher capacity in comparison to lithium manganese-base oxide having a spinel crystal structure widely used among lithium manganese-base oxides including manganese as a main component.

The layer-structured lithium manganese-based oxide of the present invention may include nickel (Ni), cobalt (Co), iron (Fe), chromium (Cr), vanadium (V), copper (Cu), or zinc (Zn), as a transition metal included in addition to Mn, essential transition metal, and one or more thereof may be included.

Ni may be included as essential transition metal and for example, Ni and Co may be each included as essential transition metal. In this case, the foregoing other transition metals may also be further included as a selective transition metal.

A content of Mn included as essential transition metal in the layer-structured lithium manganese-based oxide of the present invention is greater than contents of the other transition metals, and the content of Mn may be in a range of 40 mol % to 80 mol % based on a total amount of transition metals and for example, may be in a range of 50 mol % to 80 mol %.

In the case that the content of Mn is relatively low, safety may decrease and manufacturing costs may increase, and unique characteristics of a layer-structured lithium compound expressed as the following Chemical Formula 1 may be difficult to be exhibited. In contrast, in the case that the content of Mn is relatively high, cycle stability may decrease.

According to an exemplary embodiment of the present invention, the layer-structured lithium manganese-based oxide may be a compound expressed as the following Chemical Formula 1:

$$Li(Li_aMn_xM_{1-a-x})O_2$$ [Chemical Formula 1]

(where $0 \leq a \leq 0.2$, $x > (1-a)/2$, and M is one or more selected from the group consisting of Mn, Ni, Co, Fe, Cr, V, Cu, Zn, titanium (Ti), aluminum (Al), magnesium (Mg), and boron (B)).

As described above, the layer-structured lithium manganese-based oxide according to the present invention exhibits high-capacity characteristics due to a structural change in a predetermined range of potential, and according to an exemplary embodiment of the present invention, the electrochemical activity may occur during charging and discharging in a potential range of 2.5 V to 3.5 V after initial charge and discharge.

More particularly, the structural change may occur due to cation rearrangement and a transition from a layer crystal structure into a spinel-like crystal structure may occur due to the cation rearrangement.

However, according to the transition into a spinel-like crystal structure, limitations of a spinel structure may also occur in the cathode active material including the layer-structured lithium manganese-based oxide. That is, lithium manganese-based oxide having a spinel structure exhibits a capacity of about 120 mAh/g in both 4 V region and 3 V region, but capacity in the 3 V region, different from the 4 V region stably exhibiting capacity, is significantly decreased according to cycles. Limitations of decreasing electrical conductivity in the 3 V region may also occur in the layer-structured lithium manganese-based oxide according to the present invention after initial charge and discharge due to the transition into a spinel-like crystal structure as in the lithium manganese-based oxide having a spinel structure.

It has been known that a cause of the rapid decrease in capacity of the lithium manganese-based oxide having a spinel structure in the 3 V region according to cycles is due to the Jahn-Teller phenomenon in which a phase transition occurs from a cubic structure to a tetragonal structure by allowing an oxidation number of Mn to be reduced to trivalent through a reaction in the 3 V region. Also, through various experiments, the present inventors found another cause of relatively low electrical conductivity of the tetragonal structure in comparison to the cubic structure.

Further, the present inventors confirmed that the electrical conductivity of the tetragonal structure of the lithium manganese oxide having a spinel structure exhibited in the 3 V region is significantly lower than that of the cubic structure and simultaneously, a process of the phase transition may occur in a core-shell configuration.

That is, the core-shell configuration may be obtained, in which a portion of a shell is phase-transited to a tetragonal system while a portion of a core is maintained in a cubic system as a phase transition from the cubic system into the tetragonal system begins to occur from an outer surface of a particle of the lithium manganese-based oxide having a spinel structure.

A mechanism using the results of calculation was confirmed, in which since inner cubic spinel is consequently surrounded by the tetragonal system having low conductivity through the phase transition, the inner cubic spinel may not participate in a reaction or may participate during low-rate discharging, but the inner cubic spinel may not participate during high-rate discharging, and thus, capacity may decrease.

Therefore, as described above, the present invention may improve conductivity in the 3 V region by forming a composite through milling different kinds of carbon-based conductive materials and the layer-structured lithium manganese-based oxide, a material in which high capacity is exhibited at a high voltage of 4.4 V or more based on a cathode potential during initial charge and discharge but electrical conductivity is rapidly decreased due to the structural transition after first charge and discharge, and thus, output and cycle characteristics may be improved and high capacity may be realized.

The layer-structured lithium manganese-based oxide may be formed in a structure of a secondary particle in which a plurality of primary particles is agglomerated.

Specifically, in the case that a composite is formed by milling the layer-structured lithium manganese-based oxide with different kinds of carbon-based conductive materials, the layer-structured lithium manganese-based oxide is first milled into primary particles and surfaces thereof are then coated with the carbon-based conductive material, and the primary particles having the surfaces thereof coated with the carbon-based conductive material are agglomerated to form a secondary particle. Thus, since pathways of electrons are supplemented in the cathode active material, electrical conductivity may not be significantly decreased in the 3 V region even in the case that the phase transition into a spinel-like structure occurs after the initial charge and discharge.

The cathode active material may be a composite of the lithium manganese-based oxide of Chemical Formula 1 with a first carbon-based material having a relatively large particle diameter and a second carbon-based material having a relatively small particle diameter as the different kinds of carbon-based conductive materials.

With respect to the layer-structured lithium manganese-based oxide, a phase transition of the core-shell structure may also occur in the 3 V region due to the structural change to a spinel-like structure after initial charge and discharge, and in this case, since there may be limitations in improving electrical conductivity by simply coating the surface thereof with a conductive agent or adding graphite having good conductivity but a large size in order to improve the electrical conductivity, a lithium manganese-based oxide composite with a spinel structure including the first carbon-based material having a relatively large particle diameter and the second carbon-based material having a relatively small particle diameter may be used.

Since the composite simultaneously including the two carbon-based conductive materials having different physical properties is used, the second carbon-based material having a relatively small particle diameter may be dispersed on the surfaces of the primary particles in the secondary particle of the lithium manganese-based oxide having a spinel-like structure, and thus, the electrical conductivity of the tetragonal structure existing in the shell may be improved to increase a degree of participation in the reaction and conductive paths between the secondary particles may be provided by using the first carbon-based material having good electrical conductivity as well as a relatively large particle diameter.

According to an exemplary embodiment of the present invention, the second carbon-based material is disposed between the primary particles of the lithium manganese-based oxide in the secondary particle, and the first carbon-based material is disposed on the outer surface of the secondary particle.

The secondary particle may form a composite with the first carbon-based material and the second carbon-based material during a preparation process. The second carbon-based material is mainly disposed between the primary particles and the first carbon-based material is mainly disposed on the outer surface of the secondary particle due to the difference in the particle diameters. However, with respect to the first carbon-based material, some thereof may be crushed during a process of forming the composite and thus, may be disposed in a domain of the secondary particle.

According to an exemplary embodiment of the present invention, the second carbon-based material may be mainly disposed between the primary particles on a portion of the outer surface of the secondary particle, when the secondary particle of the lithium manganese-based oxide is assumed as a sphere.

The second carbon-based material may be uniformly disposed on an entire portion of the secondary particle in terms of conductivity. However, the synthesis thereof may not be substantially facilitated and accordingly, an amount of the second carbon-based material may be increased to decrease an amount of the spinel-based lithium manganese oxide able to participate in charge and discharge, and thus, it may not be effective in terms of energy density. Therefore, since the phase transition occurs in a core-shell configuration, it may be effective and desirable that the second carbon-based material may be mainly disposed between the primary particles of the portion of the outer surface of the secondary particle.

More particularly, the second carbon-based material may be disposed between the primary particles in a portion ranging from 0.3 r to r from a center of the secondary particle based on a radius (r) of the secondary particle. For example, the second carbon-based material may be disposed between the primary particles in a portion ranging from 0.5 r to r from the center of the secondary particle based on the radius (r) of the secondary particle.

As described above, since the lithium manganese-based oxide in the portion of the outer surface (shell) is phase-transited to the tetragonal system having low electrical conductivity to surround the cubic structure having high electrical conductivity, the second carbon-based material as a conductive material may be disposed between the primary particles of the lithium manganese-based oxide on the outer surface.

According to an exemplary embodiment of the present invention, in order to dispose each carbon-based material as above, an average particle diameter of the first carbon-based material may be in a range of 0.3 µm to 30 µm and an average particle diameter of the second carbon-based material may be in a range of 10 nm to 500 nm, which is a range of a particle diameter smaller than that of the first carbon-based material.

Also, in the case that a content of the carbon-based material is relatively low, desired effects may not be obtained. In contrast, in the case that the content of the carbon-based material is relatively high, an amount of the active material may be relatively decreased and thus, capacity may decrease. Therefore, the content of the first carbon-based material may be in a range of 1 wt % to 15 wt % based on a total weight of the cathode active material, the content of the second carbon-based material may be in a range of 1 wt % to 15 wt %, and a total content of the first carbon-based material and the second carbon-based material may be in a range of 2 wt % to 20 wt %. For example, the content of the first carbon-based material may be in a range of 1 wt % to 10 wt %, the content of the second carbon-based material may be in a range of 1 wt % to 10 wt %, and the total content of the first carbon-based material and the second carbon-based material may be in a range of 2 wt % to 15 wt %.

Various methods of forming the composite may be used and for example, the composite may be formed by using one or more methods selected from the methods able to simultaneously perform pulverization and the formation of a composite, such as high-energy milling and wet milling of the layer-structured lithium manganese-based oxide with the first carbon-based material and the second carbon-based material, and the methods able to form a composite without pulverization, such as mechano-fusion and hybridization. For example, high-energy milling may be used, but the method of forming the composite is not limited thereto, and in addition, various methods able to form a composite may be used.

In order to disperse the carbon-based material between the primary particles, the composite may be formed through high-energy milling instead of simple milling.

As another example, the composite may be formed by synthesis through addition of the first carbon-based material and the second carbon-based material or precursors thereof during sintering of the layer-structured lithium manganese-based oxide.

Specifically, the composite may be formed by solid-phase synthesis through the addition of the first carbon-based material and the second carbon-based material or precursors thereof to a lithium compound (lithium source) and a manganese compound (manganese source) used in the synthesis of the layer-structured lithium manganese-based oxide, and sintering.

The carbon-based material is not particularly limited so long as it has excellent electrical conductivity and does not generate a side reaction in an internal environment of the secondary battery. However, a carbon-based material having high electrical conductivity may be particularly used.

Examples of the first carbon-based material having high electrical conductivity may be natural graphite or artificial graphite having an average particle diameter ranging from 0.3 µm to 30 µm, and examples of the second carbon-based material may be Denka black, channel black, furnace black, Ketjen black, or carbon black having an average particle diameter ranging from 10 nm to 500 nm, which is a range of a particle diameter smaller than that of the first carbon-based material. In some cases, conductive polymers having high conductivity may also be used.

A second cathode active material may be further added to the cathode. For example, one or more compounds selected from the following compounds may be used as the second cathode active material: a layered compound, such as lithium cobalt oxide ($LiCoO_2$) or lithium nickel oxide ($LiNiO_2$), or a compound substituted with one or more transition metals; lithium manganese oxides having spinel crystal structure of chemical formula $Li_{1+x+y}Mn_{2-y-z}M'_zO_4$ (where x is 0 to 1, y is 0 to 0.5, z is 0 to 0.2, and M is one or more selected from Al and Mg) or spinel lithium manganese oxides having a part of Mn in the above chemical formula substituted with lithium, or Li-excess spinel lithium manganese oxides and spinel lithium manganese oxides having a part of Mn substituted with alkaline earth metal ions; layer chalcogenide such as $TiS_2$ or $VS_2$; lithium manganese oxides such as $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; Ni-site type lithium nickel oxides expressed as a chemical formula of $LiNi_{1-x}M_xO_2$ (where M is one or more selected from the group consisting of Co, Mn, Al, Cu, Fe, Mg, B, and gallium (Ga), and x is 0.01 to 0.3); lithium manganese complex oxides expressed by a chemical formula of $LiMn_{2-x}M_xO_2$ (where M is one or more selected from the group consisting of Co, Ni, Fe, Cr, Zn, and tantalum (Ta), and x is 0.01 to 0.1) or $Li_2Mn_3MO_8$ (where M is one or more selected from the group consisting of Fe, Co, Ni, Cu, and Zn); a disulfide compound; tertiary complex oxides such as $Li_{1+a}Ni_xMn_yCo_zM_bO_{2-c}X_c$ (where M is one or more selected from Al and Mg, X is one or more selected from the group consisting of fluorine (F), sulfur (S), and nitrogen (N), $-0.5 \le a \le +0.5$, $0 < x \le 0.8$, $0 < y \le 0.8$, $0 < z \le 0.8$, $0.8 \le x+y+z \le 1.2$, $0 \le b \le 0.1$, and $0 \le c \le 0.1$); olivine-structured oxides such as $Li_{1+a}Fe_{1-x}M_x(PO_{4-b})X_b$ (where M is one or more selected from the group consisting of Al, Mg, Ni, Co, Mn, Ti, Ga, Cu, V, niobium (Nb), zirconium (Zr), cerium (Ce), indium (In), Zn, and yttrium (Y), X is one or more selected from the group consisting of F, S, and N, $-0.5 \le a \le +0.5$, $0 \le x \le 0.5$, and $0 \le b \le 0.1$); and one or more selected from $Fe_2(MoO_4)_3$ and the like.

In this case, one or more second cathode active materials may be included and the second cathode active material may be included in an amount of less than 50% based on the total weight of the active material so as to allow characteristics of the lithium transition metal oxide according to the present invention to be effectively exhibited.

The present invention also provides a cathode mixture including the foregoing cathode active material.

The cathode mixture may selectively include a binder and a filler in addition to the cathode active material.

The binder is a component that assists in bonding between the active material and the conductive agent and bonding with respect to a current collector, and may be typically added in an amount ranging from 1 wt % to 30 wt % based on a total weight of the mixture including the cathode active material. Examples of the binder may be polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butyrene rubber, fluorine rubber, various copolymers, etc.

The filler is selectively used as a component that prevents expansion of the cathode and is not particularly limited so long as it does not generate chemical changes in the battery as well as being a fibrous material. Examples of the filler may be olivine-based polymers such as polyethylene and polypropylene; and fibrous materials such as glass fibers and carbon fibers.

However, since the first carbon-based material and the second carbon-based material included in the cathode active material of the present invention contribute to conductivity, a separate conductive agent may not be added during the formation of the cathode mixture. However, the case of adding a conductive agent is also included in the scope of the present invention. A particular example of the conductive agent may be the same as that later described in the content related to a anode.

Also, the present invention provides a cathode for a secondary battery having a current collector coated with the cathode mixture.

For example, a cathode collector is coated with a slurry prepared by mixing the cathode active material in a solvent such as N-methylpyrrolidone (NMP), and the cathode for a secondary battery may then be prepared by drying and rolling.

The cathode collector generally has a thickness range of 3 µm to 500 µm. The cathode collector is not particularly limited so long as it does not generate chemical changes in the battery as well as having conductivity. Examples of the cathode collector may be stainless steel, aluminum, nickel, titanium, sintered carbon, aluminum or stainless steel surface treated with carbon, nickel, titanium, or silver, etc. Fine irregularities may also be formed on a surface of the current collector to increase adhesion of the cathode active material, and the current collector may have various forms such as a film, sheet, foil, net, porous body, foam, or nonwoven fabric.

The present invention also provides a lithium secondary battery composed of the cathode, a anode, a separator, and a lithium salt-containing non-aqueous electrolyte. The lithium secondary battery according to the present invention may also have excellent capacity and cycle characteristics in a voltage range of 2.5 V to 3.5 V, i.e., the 3 V region, as well as the 4 V region.

The anode, for example, may be prepared by coating a anode collector with a anode mixture including a anode active material and then drying, and the anode mixture may include the foregoing components as needed.

Examples of the anode active material may be carbon and graphite materials such as natural graphite, artificial graphite, expandable graphite, carbon fibers, non-graphitizable carbon, carbon black, carbon nanotubes, fullerene, and activated carbon; metal alloyable with lithium, such as Al, silicon (Si), tin (Sn), silver (Ag), bismuth (Bi), Mg, Zn, In, germanium (Ge), lead (Pb), palladium (Pd), platinum (Pt), and Ti, and a compound thereof; a composite of the metal and compound thereof with the carbon and graphite materials; and lithium-containing nitride. Among these anode active materials, carbon-based active material, silicon-based active material, tin-based active material, or silicon-carbon-based active material, for example, may be used, and these active materials may be used alone or in combination of two or more.

A conductive agent may be included in the anode mixture, and in this case, the conductive agent may be added in an amount ranging from 1 wt % to 30 wt % based on a total weight of the mixture including the anode active material. The conductive agent is not particularly limited so long as it does not generate chemical changes in the battery as well as having conductivity. Examples of the conductive agent may be graphite such as natural graphite or artificial graphite; carbon black such as acetylene black, Ketjen black, channel black, furnace black, lamp black, or thermal black; conductive fibers such as carbon fibers or metal fibers; metal powder such as fluorocarbon powder, aluminum powder or nickel powder; conductive whiskers such as zinc oxide whiskers and potassium titanate whiskers; conductive metal oxide such as titanium oxide; a conductive material, such as a polyphenylene derivative, etc.

The anode collector generally has a thickness range of 3 µm to 500 µm. The anode collector is not particularly limited so long as it does not generate chemical changes in the battery as well as having high conductivity. Examples of the anode collector may be copper, stainless steel, aluminum, nickel, titanium, sintered carbon, copper or stainless steel surface treated with carbon, nickel, titanium, or silver, aluminumcadmium alloy, etc. Also, as in the cathode collector, fine irregularities may also be formed on a surface of the current collector to increase adhesion of the anode active material, and the current collector may be used in various forms such as a film, sheet, foil, net, porous body, foam, or nonwoven fabric.

The separator is disposed between the cathode and anode, and an insulating thin film having high ion permeability and mechanical strength is used as the separator. The separator generally has a pore diameter range of 0.01 µm to 10 µm and has a thickness range of 5 µm to 300 µm. For example, a sheet or nonwoven fabric formed of an olefin-based polymer, such as chemical resistant and hydrophobic polypropylene; and glass fibers or polyethylene is used as the separator. When a solid electrolyte, such as a polymer, is used as an electrolyte, the solid electrolyte may also be used as the separator.

The lithium salt-containing non-aqueous electrolyte is composed of an electrolyte and a lithium salt. A non-aqueous organic solvent, an organic solid electrolyte, and an inorganic solid electrolyte may be used as the electrolyte.

Examples of the non-aqueous organic solvent may be aprotic organic solvents such as N-methyl-2-pyrrolidone, propylene carbonate, ethylene carbonate, butylene carbonate, dimethyl carbonate, diethyl carbonate, γ-butyrolactone, 1,2-dimethoxyethane, tetrahydroxy franc, 2-methyltetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

Examples of the organic solid electrolyte may be a polyethylene derivative, a polyethylene oxide derivative, a polypropylene oxide derivative, a phosphate ester polymer, poly agitation lysine, polyester sulfide, polyvinyl alcohol, polyvinylidene fluoride, a polymer including an ionic dissociation group, etc.

Examples of the inorganic solid electrolyte may be nitrides, halides, or sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material suitable for being dissolved in the non-aqueous electrolyte, and for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3L_1$, $CF_3SO_3Li$, $(CF_3SO_2)_2$ NLi, chloroborane lithium, lower aliphatic carboxylic acid lithium, lithium tetraphenyl borate, and imide may be used.

Also, in order to improve charge and discharge characteristics and flame retardancy, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, aluminum trichloride or the like, for example, may be added to the electrolyte. In some cases, in order to provide incombustibility, halogen-containing solvents, such as carbon tetrachloride and ethylene trifluoride, may be further included, carbon dioxide gas may be further included in order to improve high-temperature storage characteristics, and fluoro-ethylene carbonate (FEC) or propene sultone (PRS) may be further added.

The secondary battery according to the present invention may not only be used in a battery cell used as a power source of a small device, but may also be used as a unit cell in a medium and large sized battery module including a plurality of battery cells, which may be used as a power source of a medium and large sized device.

Examples of the medium and large sized device may be a power tool; an electric vehicle (EV) including an electric car, a hybrid electric vehicle (HEV), and a plug-in hybrid electric vehicle (PHEV); an electric two-wheeled vehicle including an E-bike and an E-scooter; an electric golf cart; an electric truck; an electric commercial vehicle; and a power storage system, but the medium and large sized device is not limited thereto.

Hereinafter, the present invention will be described in detail, according to specific examples.

EXAMPLE

Preparation of Cathode

An aqueous solution (Ni:Mn=1.3) of $NiSO_4$ and $MnSO_4$ was mixed with a 1N $NaHCO_3$ aqueous solution and ammonium hydroxide was then added to prepare Ni—Mn mixed carbonate by using a coprecipitation method which adjusts a pH to 8. The prepared Ni—Mn mixed carbonate was mixed with $LiCO_3$ and a mixture was then sintered at 1000° C. for 6 hours in an air atmosphere to prepare lithium nickel-manganese oxide expressed as Chemical Formula 1.

As a result of analysis on the stoichiometry of the prepared lithium nickel-manganese oxide by inductively coupled plasma atomic emission spectroscopy (ICP-AES, Thermo Jarrel Ash, Polyscan 60E, USA), it was confirmed that the prepared lithium nickel-manganese oxide has a composition of $Li_{1.234}Ni_{0.186}Mn_{0.582}O_2$.

The 80 wt % lithium nickel-manganese oxide, 7 wt % graphite, and 7 wt % Denka black were spex milled to form a composite and then mixed with 6 wt % polyvinylidene fluoride (PVDF) in a NMP solvent to prepare a cathode active material slurry.

An aluminum (Al) foil, a cathode collector, was coated with the slurry, and the coated Al foil was rolled and dried to prepare a cathode material for a secondary battery.

Preparation of Lithium Secondary Battery

The cathode thus prepared and a Li counter electrode, a separator (Celgard 2400), and 1M $LiPF_6$ in ethylene carbonate (EC)/dimethyl carbonate (DMC) (1:1 v/v) were used to prepare a coin cell.

The prepared coin cell was charged at 4.6 V based on a cathode potential and then discharged to perform a formation process (C-rate=0.1 C).

Comparative Example

A coin cell was prepared in the manner as the example except that spex milling was not performed.

Experimental Example

Figure 1:
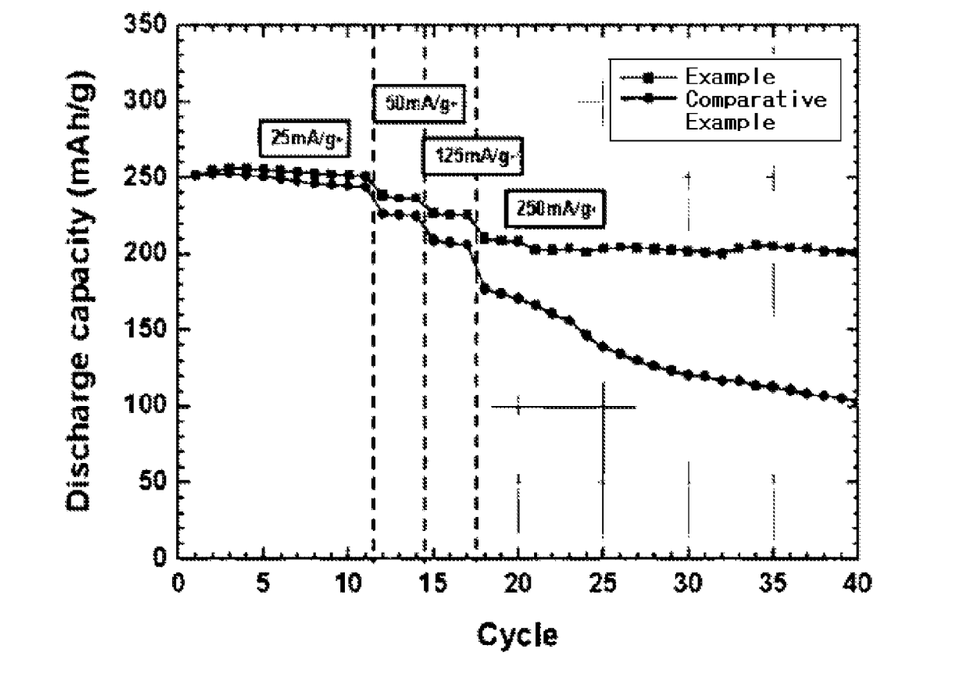
FIG. 1 is a graph illustrating changes in discharge capacity according to an increase in the number of cycles for lithium secondary batteries according to example and comparative example of the present invention.

Discharge capacities of the coin cells prepared in the example and the comparative example according to cycles in a voltage range of 4.6 V to 2 V based on a cathode potential were measured and the results thereof are presented in FIG. 1.

As illustrated in FIG. 1, with respect to the lithium battery according to the example, a decrease in discharge capacity according to an increase in the number of cycles was insignificant. However, with respect to the lithium battery of the comparative example, a decrease in discharge capacity according to an increase in the number of cycles was noticeable.

Therefore, the present invention may improve a decrease in electrical conductivity and capacity in the 3 V region due to the transition into a spinel-like structure after initial charge and discharge by forming a composite of the layer-structured lithium manganese-based oxide and different kinds of carbon-based conductive materials. As a result, it was confirmed that output characteristics, cycle characteristics, and lifetime characteristics of the secondary battery were improved.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A cathode active material comprising a composite of a layer-structured lithium manganese-based oxide and different kinds of carbon-based conductive materials,
   wherein the layer-structured lithium manganese-based oxide includes lithium (Li), manganese (Mn) and an element (M),
   wherein the layer-structured lithium manganese-based oxide has a molar content of Mn greater than a molar content of M,
   wherein the layer-structured lithium manganese-based oxide includes 1 mole or more of lithium (Li) with respect to 1 mole of the layer-structured lithium manganese-based oxide,
   wherein the layer-structured lithium manganese-based oxide has a plateau potential range in which lithium deintercalation as well as oxygen release occurs during initial charging in a high voltage range of 4.4 V or more,
   wherein the different kinds of carbon-based conductive materials comprise a first carbon-based material and a second carbon-based material, wherein a particle diameter of the first carbon-based material is larger than a particle diameter of the second carbon-based material, and
   wherein the layer-structured lithium manganese-based oxide has a composition of the following Chemical Formula 1:

$Li(Li_aMn_xM_{1-a-x})O_2$      [Chemical Formula 1]

(where $0<a\le0.2$, $x>(1-a)/2$, and M is one or more selected from the group consisting of Mn, nickel (Ni), cobalt (Co), iron (Fe), chromium (Cr), vanadium (V), copper (Cu), zinc (Zn), titanium (Ti), aluminum (Al), magnesium (Mg), and boron (B)).

2. The cathode active material of claim 1, wherein the cathode active material exhibits electrochemical activity due to a structural change to a spinel-like structure after the initial or several times of charging at a voltage of 4.4 V or more.

3. The cathode active material of claim 1, wherein the layer-structured lithium manganese-based oxide is formed of a primary particle or a secondary particle in which the plurality of primary particles is agglomerated.

4. The cathode active material of claim 1, wherein a secondary particle of the lithium manganese-based oxide has the second carbon-based material disposed between primary particles of the lithium manganese-based oxide in the secondary particle, and
   wherein the first carbon-based material is disposed on outer surface of the secondary particle.

5. The cathode active material of claim 4, wherein the second carbon-based material is mainly disposed between the primary particles on a portion of the outer surface of the secondary particle when the secondary particle of the lithium manganese-based oxide is assumed as a sphere.

6. The cathode active material of claim 5, wherein the second carbon-based material is disposed between the primary particles in a portion ranging from 0.3 r to r from a center of the secondary particle based on a radius (r) of the secondary particle.

7. The cathode active material of claim 1, wherein the particle diameter of the first carbon-based material is in a range of 0.3 μm to 30 μm and the particle diameter of the second carbon-based material is in a range of 10 nm to 500 nm, which is a range of a particle diameter smaller than that of the first carbon-based material.

8. The cathode active material of claim 1, wherein a content of the first carbon-based material is in a range of 1 wt % to 15 wt % based on a total weight of the cathode active material, a content of the second carbon-based material is in a range of 1 wt % to 15 wt %, and a total content of the first carbon-based material and the second carbon-based material is in a range of 2 wt % to 20 wt %.

9. The cathode active material of claim 1, wherein the cathode active material is formed by using any one method of high-energy milling, wet milling, mechano-fusion, or hybridization of the layer-structured lithium manganese-based oxide with the first carbon-based material and the second carbon-based material.

10. The cathode active material of claim 1, wherein the cathode active material is formed by high-energy milling of the layer-structured lithium manganese-based oxide with the first carbon-based material and the second carbon-based material.

11. The cathode active material of claim 1, wherein the cathode active material is formed by synthesis through addition of the first carbon-based material and the second carbon-based material during sintering of the lithium manganese-based oxide.

12. The cathode active material of claim 11, wherein the cathode active material is formed by synthesis through addition of the first carbon-based material and the second carbon-based material or precursors thereof to a lithium compound and a manganese compound used in synthesis of the lithium manganese-based oxide.

13. The cathode active material of claim 1, wherein the first carbon-based material is one or more selected from the group consisting of natural graphite and artificial graphite, and the second carbon-based material is one or more selected from the group consisting of Denka black, channel black, furnace black, Ketjen black, and carbon black.

14. The cathode active material of claim 1, wherein the cathode active material further comprises one or more lithium-containing metal oxides selected from the group consisting of lithium cobalt oxide, lithium nickel oxide, lithium manganese oxide including lithium manganese spinel, lithium cobalt-nickel oxide, lithium cobalt-manganese oxide, lithium manganese-nickel oxide, lithium cobalt-nickel-manganese oxide, lithium-containing olivine-type phosphate, and oxide having other element(s) substituted or doped thereto.

15. The cathode active material of claim 14, wherein the lithium-containing metal oxide is included within an amount of 50 parts by weight based on 100 parts by weight of the cathode active material.

16. The cathode active material of claim 14, wherein the other element(s) is one or more selected from the group consisting of Al, Mg, Ni, Co, Fe, Cr, V, Ti, Cu, B, calcium (Ca), Zn, zirconium (Zr), niobium (Nb), molybdenum (Mo), strontium (Sr), antimony (Sb), tungsten (W), and bismuth (Bi).

17. A cathode mixture comprising the cathode active material of claim 1.

18. A cathode for a secondary battery having a current collector coated with the cathode mixture of claim 17.

19. A lithium secondary battery comprising the cathode for a secondary battery of claim 18.

20. The lithium secondary battery of claim 19, wherein the lithium secondary battery is used as a unit cell of a battery module, a power source of a medium and large sized device.

21. The lithium secondary battery of claim 20, wherein the medium and large sized device is a power tool; an electric vehicle (EV) including an electric car, a hybrid electric vehicle (HEV), and a plug-in hybrid electric vehicle (PHEV); an electric two-wheeled vehicle including an electric bike and an electric scooter; an electric golf cart; an electric truck; an electric commercial vehicle; or a power storage system.

* * * * *